United States Patent [19]

Granat

[11] 4,432,246

[45] Feb. 21, 1984

[54] DISPLACEMENT AND/OR FORCE MEASURING DEVICE AND METHOD

[75] Inventor: Rodney J. Granat, Caulfield, Australia

[73] Assignee: ACI Australia Limited, Victoria, Australia

[21] Appl. No.: 329,136

[22] Filed: Dec. 9, 1981

[30] Foreign Application Priority Data

Dec. 12, 1980 [AU] Australia ............... PE6928

[51] Int. Cl.³ .................. G01L 1/04; G01L 5/00
[52] U.S. Cl. .................. 73/862.53; 73/432 R; 73/862.62; 73/862.54
[58] Field of Search .......... 73/862.01, 862.02, 862.53, 73/862.54, 381, 432 J, 432 V, 862.62

[56] References Cited

U.S. PATENT DOCUMENTS

| | | | |
|---|---|---|---|
| 468,154 | 2/1892 | McClure | 73/381 |
| 720,575 | 2/1903 | Fremont | 73/862.53 X |
| 1,845,098 | 2/1932 | Pollack | 73/862.54 |
| 3,289,472 | 12/1966 | Lipe et al. | 73/862.02 |
| 3,918,301 | 11/1975 | Baer | 73/862.53 |

*Primary Examiner*—Charles A. Ruehl
*Attorney, Agent, or Firm*—Cushman, Darby & Cushman

[57] ABSTRACT

A device for measuring the distance moved by an applicator head of a container filling and capping station and, hence, a force applied by the head, the device having a housing, a plunger telescopically inter-fitted with the housing so as to be substantially linearly movable relative thereto, a biasing device biasing the members to a rest position, and an indicator mounted on the members; the indicator having at least one component thereof movable such that, during one stage of relative movement of the members from their rest position against the bias of the biasing device and return to their rest position under such bias, the at least one component is fixed relative to one of the members and movable relative to the other member, and such that during the other stage of that movement the at least one component is fixed relative to the other of the members and movable relative to the one member to thereby provide a measure of the relative movement of the members in one of the stages, and wherein the external form of the measuring device corresponds to a standard container to which a closure member is to be fitted by an applicator head of a container filling and capping machine, such that the measuring device can be inserted upstream from the applicator head in a process line for containers passed through the machine and thereby subjected to the action of the applicator head to obtain a read-out of distance moved or pressure applied by the applicator head.

14 Claims, 5 Drawing Figures

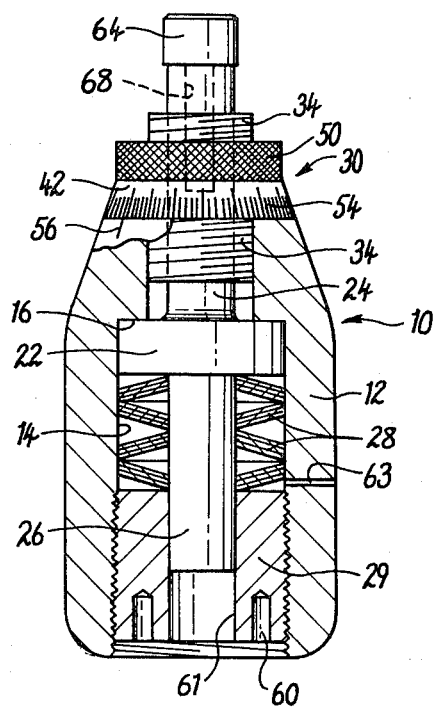
FIG. 1
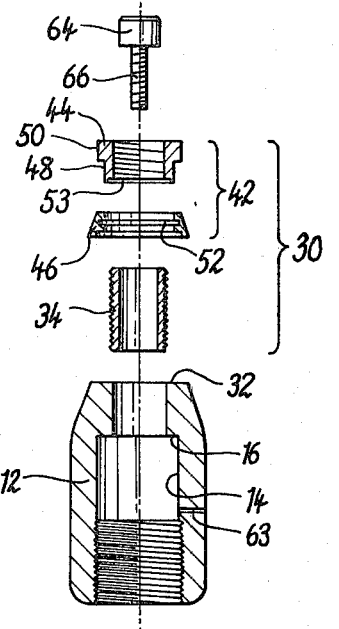
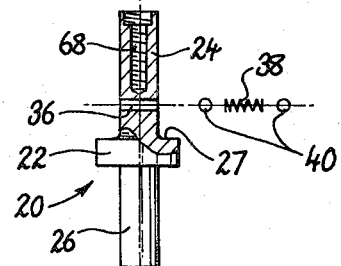
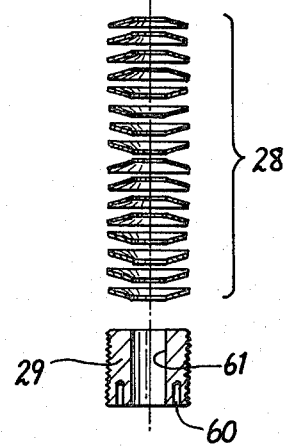
FIG. 4
FIG. 2

DISPLACEMENT AND/OR FORCE MEASURING DEVICE AND METHOD

This invention relates to a measuring device suitable for measuring movement of a movable member. The device also may be suitable for measuring pressure applied by or to such member in its movement, such as the pressure applied in applying a closure member in a capping operation in a container filling machine.

In the application of closure members to containers, such as to carbonated beverage bottles, the containers pass from a filling station to a capping station at which the closure members are applied. The closure members may be of the crown seal or threaded form and normally are applied by an applicator head of any automatic applicator mechanism. The applicator head is required to exert a predetermined force, for each form and size of closure member, should be maintained within specific limits; the applicator head may move through a distance in applying such force or pressure. Insufficient pressure can result in the closure member being inadequately applied, with leakage or contamination of the contents of the container resulting; while an excessive pressure can cause damage to the closure member and/or container.

The force or pressure exerted by the applicator head thus needs to be capable of accurate determination. However, such determination normally necessitates interruption of the bottle filling/closure member application process line. Also, it may be necessary to remove the safety-guards provided at the capping station to protect personnel, as well as some ancilliary fittings, to enable access to the applicator head for determination of its applied force and/or distance moved.

The present invention is directed to providing a measuring device. The device can be of a form suitable for measuring the force applied by such an applicator head and/or the distance through which the head moves in applying force, but it is to be understood that the device is useful in other applications. Where suitable for such measurement, the device most conveniently is capable of use without interrupting normal operation of the machining of which the applicator head forms a sub-unit.

According to the invention, there is provided a measuring device having a housing member, a plunger member telescopically inter-fitted with the housing member so as to be substantially linearly movable relative thereto, biasing means biasing said members to a rest position, and indicator means mounted on said members; said indicator means having at least one component thereof movable such that, during one stage of relative movement of the members from their rest position against the bias of said biasing means and return to their rest position under said bias, said at least one component is fixed relative to one of said members and movable relative to the other member, and such that during the other stage of that movement said at least one component is fixed relative to the other of said members and movable relative to the one member to thereby provide a measure of the relative movement of the members in one of said stages.

In a first arrangement, the indicator means is mounted on the housing member, exteriorly thereof. In this arrangement, the application of force to the device, in the direction in which the members are movable against the bias of the biasing means in the first stage of their movement, preferably is such as to move the plunger member relative to the indicator means and to the housing member. However, on release of that force, the members return to their rest position under the action of the biasing means in the second stage of their movement; with the indicator means being moved with, and in a fixed relationship to, the plunger member but relative to the housing member. As the movement in each direction, i.e. in each stage of the overall movement, will be substantially in proportion to the distance moved by the means applying the force, and to the magnitude of force applied, provided the elastic limit of the biasing means is not exceeded, movement of indicator means therefore provides a measure of that distance and force.

In a second arrangement, the indicator means is mounted interiorly of the housing member. In this arrangement, the application of a force, in the direction in which the members are movable against the bias of the biasing means, preferably is such as to move at least one component of the indicator means relative to the housing member but in a fixed relationship with the plunger member. However, in this case, the at least one component is retained in a fixed relationship with the housing means on release of the force to allow the members to return to their rest position; with the plunger member moving relative to the at least one component of the indicator means. Again, the movement of the at least one component of the indicator means will provide a measure of the distance moved by the force applying means and the magnitude of the applied force.

The housing member may be in the form of a body defining a bore. In this case, the plunger member may be slidable in the bore. Most conveniently, the biasing means biases the plunger member so that a portion of the latter projects beyond one end of the bore, with such projection being a maximum with the members in their rest position. At least an intermediate portion of the plunger member may be a neat sliding fit within the bore.

The bore may be stepped intermediate its length to define a shoulder facing oppositely to the direction in which the biasing means biases the plunger member. In such case, the plunger member may be stepped intermediate its length to define a shoulder facing that defined by the bore. Abutment of the respective shoulders may be the means by which the rest position for the members is defined.

In the first arrangement, the indicator means may be frictionally engaged with the one of the members so as to be movable therewith unless constrained. In the above described form for the housing and plunger members, the indicator means may be so engaged with the projecting portion of the plunger member. In such case, the indicator means may be constrained against movement with the plunger member during movement of the members from the rest position, despite such frictional engagement, due to abutment of the measuring means with the housing member.

In the second arrangement, the movable component(s) of the indicator means may be frictionally engaged with one of the members so as to be fixed relative thereto unless constrained to move by the other member. In the above described form for the housing and plunger members, the indicator means may have at least one movable component frictionally engaged within the bore defined by the housing member. In such case, the at least one component is movable relative to the housing member with movement of the plunger member from its rest position, due to abutment of the component with the plunger member; although the frictional engagement retains the component fixed in relation to the housing member during return movement of the plunger member to its rest position.

While movement of the indicator means with the member with which it is engaged provides a measure of distance moved by means that has applied a force to the device and also of the magnitude of the force, greater accuracy than a reading of linear distance moved by the measuring means is desirable. This can be provided by measuring rotational movement of known pitch, about an axis parallel to the direction of linear movement of the indicator means. In one arrangement for the above-described externally mounted indicator means, permitting such measurement of rotational movement, the indicator means includes an externally theaded sleeve with which the frictional engagement is made and a collar in threaded engagement with, and rotatable on, the sleeve. With such arrangement, the collar and sleeve are adjusted to a zero position and, after movement together (i.e. without relative rotation between the collar and sleeve) with return of the housing and plunger members to their rest position, the collar can be rotated on the sleeve to provide an accurate measure of the linear distance moved by the indicator means and, hence, of the force. The collar may be provided with calibration markings around its circumference to facilitate determination of the rotational measurement, such as relative to a reference marking on the device.

In the above described form of the first and second members, such arrangement for the indicator means can be frictionally engaged by the sleeve being received over the projecting portion of the plunger member. Frictional engagement between the sleeve and the projecting portion can be by any suitable means. Thus the projecting portion may have at least one member, such as a frictional pad or other suitable member biased toward, and frictionally engaging, the inner surface of the sleeve. Alternatively at least one such friction pad or other member may be similarly carried by the sleeve and bised so as to frictionally engage the outer surface of the projecting portion of the plunger member. In one practical arrangement, a bore may be provided in the projecting portion of the plunger member so as to extend substantially diametrically with respect to the sleeve; with a spring within the bore biasing a respective friction bearing or ball outwardly of each end of the bore to frictionally engage the inner surface of the sleeve.

In the second arrangement, the indicator means may have a spindle extending in the direction in which the housing and plunger members are movable, and an indicator needle rotatable in a plane extending transversely of that direction over a calibrated dial. In such arrangement, the indicator means preferably has a component member frictionally engaged within the housing member bore and engaged with a helical cam groove in the spindle such that, with movement of the plunger member from its rest position, it moves the component despite its frictional engagement in the bore so as to rotate the spindle and needle. The extent of rotation of the needle provides a read-out proportional to movement of the component and, hence, the movement of the plunger member from its rest position relative to the housing member. Also, the frictional engagement prevents return movement of the component of the indicator means, during movement of the plunger means back to its rest position, so as to retain the needle at its readout position.

The cam drive engagement between the component and the spindle can be direct, due to the component having an integral cam follower projection engaged in the groove of the spindle. Alternatively, the component can be engaged with and move a rod or similar member in the direction in which the housing and plunger members are movable, with such rod having a laterally projecting pin engaged in the groove of the spindle.

The biasing means for biasing the housing and plunger members to their rest position can be of a variety of forms, such as at least one suitably positioned coil spring of suitable compressive or tensional strength. In the above described form of the housing and plunger members, the biasing means can be fitted within the bore of the housing member, such as to bear against an end surface of the plunger member remote from or facing away from the projecting portion thereof. The plunger member may have a reduced diameter portion extending beyond that surface such as to define within the bore of the housing member an annular chamber in which the biasing means is located. One particularly suitable form of biasing means is provided by a stack of Belleville washers located in such chamber; the washers being stacked in a parallel, series or, most conveniently, a parallel-series array.

In the accompanying drawings:

FIG. 1 shows in vertical section a first form of pressure measuring device, suitable for measuring the pressure head of an applicator mechanism of a bottling machine;

FIG. 2 is an exploded view showing the parts of the device of FIG. 1;

FIGS. 4 and 5 provide detailed views of parts of the device of FIG. 3.

Figure 3:
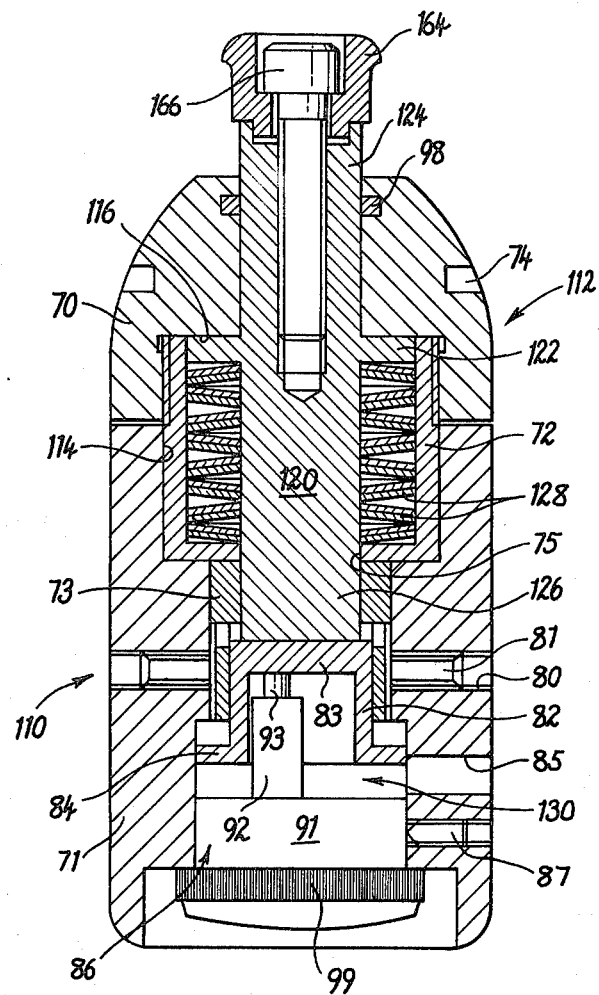
FIG. 3 shows, in a section similar to that of FIG. 1, a second form of device.

The device 10 of FIGS. 1 and 2 has a first member or housing 12 which defines a bore 14. The latter is stepped intermediate its ends to define a downwardly facing shoulder 16. Within bore 14 there is a second member or plunger 20. The latter has a larger section, intermediate portion 22 corresponding in section to the larger diameter portion of bore 14 in which it provides a neat sliding fit.

For ease of construction, bore 14 and at least portion 22 of plunger 20 each is of circular section, although other forms are possible. The outer surface of housing 12 also is cylindrical, for ease of construction and also for a further reason that will become apparent in the following.

Above and below portion 22, plunger 20 has a respective extension 24, 26. With the annular upper face 27 of portion 22 abutting shoulder 16, housing 12 and plunger 20 are in what is designated as their rest position. Housing 12 and plunger 20 are biased to that position by a parallel-series stack of Belleville washers 28 in the annular space defined by bore 14 and plunger extension 26. Washers 28 are retained in that space under light compressive loading by externally threaded annular plug 29 in threaded engagement with a thread at the lower end of bore 14, to provide the bias holding members 12, 20 in their rest position.

As shown, plunger extension 24 projects from the upper end of bore 14. An indicator means 30 is received on extension 24 and, due to frictional engagement there-between, means 30 is movable such that its lower surface rests on upper annular surface 32 of housing 12.

Indicator means 30 includes an externally threaded sleeve 34 by which it is in engagement with extension 24. A transverse bore 36 through extension 24 is provided with a spring 38 which urges a respective ball 40 to each end of bore 36 to engage the inner surface of sleeve 34 and provide such frictional engagement.

Means 30 also includes an annular collar 42 consisting of an asembly of an annular ring 44 and a frusto-conical sleeve 46. Ring 44 is internally threaded so as to be engageable on sleeve 34, while its outer surface has a reduced diameter lower portion 48 and a knurled upper portion 50. Sleeve 46 is received on ring portion 48 and, on its inner surface has a circumferential groove 52 in which is provided a wire circlip (not shown) for initially gripping the outer surface of portion 48 of ring 44. With ring 44 and sleeve 48 so assemblied, a bead 53 at the lower edge of ring 44 is peened over to retain ring 44 and sleeve 46 in assembly.

The frusto-conical outer surface of sleeve 46 is provided with graduated markings 54, most conveniently from 0-100, around its circumference. Also, a zero setting mark 56 is provided on the outer surface of housing 12, adjacent to those markings.

The device 10 is of a height corresponding to a standard container to be filled and capped in a bottling machine. The external configuration of housing 12 also approximates to that of such container, while the upper end of plunger 20 approximates in diameter to that of the neck of the container. The device thus is such that it can be inserted in the container process line, such as after the filling station, and is able to move in that line in the same manner as an actual container and be subjected to the action of the applicator mechanism at the capping station.

When it is required to determine the force or pressure exerted on a container by the applicator head in a capping operation, the sleeve 34 and collar 42 are adjusted so that the zero of markings 54 is in register with setting mark 56, with collar 42 abutting surface 32 of housing 12. Device 10 then is inserted in the container process line and is moved in turn to the capping station. When the device is at that station, the applicator head lowers as if to apply a closure member to the device and thus brings the closure member to bear on the upper end of plunger 20. The resultant pressure brought to bear on the device results in plunger 20 being urged downwardly against a reaction force exerted by washers 28. However, as housing 12 is supported on the same structure as supports a container during capping and as indicator means 30 abuts the upper surface of housing 12, plunger 20 thus is depressed relative thereto a distance proportional to the pressure exerted by the applicator head. As will be appreciated, the reactive force of housing 12 against indicator means 30 results in the frictional engagement between that means and plunger extension 24 being overcome.

When the applicator head lfts, washers 28 recover to provide reverse movement of plunger 20 relative to housing 12 to bring plunger portion 22 into abutment with shoulder 16. During this movement, there is no constraint on any of the components of indicator means 30 and the latter thus moves as an assembly, due to the frictional engagement with plunger extension 24, and is lifted away from surface 32 of housing 12. Just as the initial depression of plunger 20 was proportional to the pressure exerted on it by the applicator head, the equal reverse movement and, hence, the extent to which indicator means 30 is lifted, also is proportional to that pressure. After removal of device 10 from the container process line, it is necessary then simply to rotate collar 42 on sleeve 34, with the latter fixed relative to plunger 20, so that collar 42 again abuts surface 32. A reading from markings 54 and mark 56 then is taken and also is proportional to that pressure.

It is necessary to calibrate device 10 before use by subjecting it to a range of known loadings to establish a table or graph equating pressures with markings 54 and mark 56. A reading taken as in the preceding paragraph then can be converted to the corresponding force. It is found that the device provides a reliable measure of the force applied by the applicator head, the accuracy possible being within about 1%.

As will be appreciated, the applicator head at the capping station of a bottle filling machine moves through a relatively small distance. Particularly in such case, it is found that Belleville washers perform satisfactorily as biasing means to resist the corresponding limited movement of plunger 20. The number of such washers can be varied, depending on the level of pressure to be determined and, to permit this, plug 29 is removable such as by having "C" spanner holes 60. However, variation in the washers 28 would necessitate recalibration of the device.

As shown, plunger extension 26 is guided in bore 61 of plug 29 and itself serves to retain washers 28 in the required stacked relationship. Also, to facilitate relative movement of washers 28 and plunger 20 in bore 14, the larger diameter section of the latter is packed with grease. The grease also serves to dampen recovery of washers 28 so that initial movement of plunger 20, in returning to its rest position relative to housing 12, does not occur relative to indicator means 30 due to inertia of the latter. A bleed vent 63 is provided in housing 12 to accommodate displacement of grease with movement of plunger 26.

The upper end of plunger 20 most conveniently is provided with a hardened head. This can be provided by a cylindrical anvil member 64 which has a threaded shank 66 received in threaded axial bore 68 in the upper end of the plunger. When device 10 is to measure the force applied by an applicator head of a bottle filling machine, member 64 most conveniently has a configuration approximating that of the neck of the particular type of container being handled by the machine. Member 64 can be replaced by another such member of different configuration where the containers are changed to a type having a different neck configuration.

Figure 5:
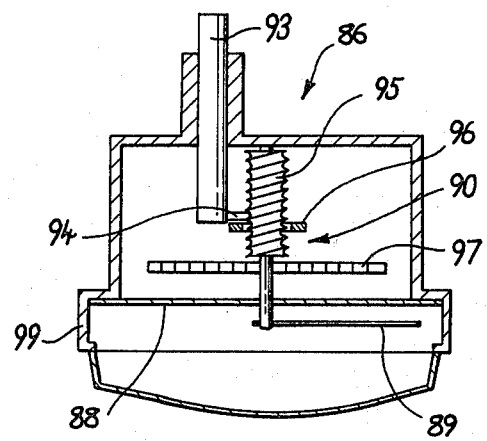

An alternative form of device is shown in FIGS. 3 to 5. In this, parts functionally equivalent to those of device 10 of FIGS. 1 and 2 are identified by the same reference numerals, plus 100.

As with device 10, device 110 of FIGS. 3 to 5 is shown as being of substantially circular horizontal section, although other sections are possible. Housing 112 has upper and lower portions 70,71 which define bore 114, in which plunger 120 is longitudinally movable. Bore 114 has an enlarged diameter intermediate portion lined by sleeve 72 in which portion 122 of plunger 120 is slidable but biased, by Belleville washers 128, to abut shoulder 116 defined by housing portion 70. A reduced diameter portion of bore 114, located immediately below sleeve 72, is lined by split sleeve 73; with bore 114 being of an intermediate diameter below sleeve 73.

Housing portions 70,71 are secured together by firm frictional engagement of sleeve 72 in portion 71, and screw-threaded engagement of portion 70 on the end of sleeve 72 projecting above portion 71. A number of circumferentially spaced apertures 74 are provided in upper portion 70 to enable insertion of a tool to facilitate separation of the housing portions for maintenance of the device 110, or to enable washers 128 to be replaced by washers of different stiffness.

As shown, sleeve 72 is of cup shape and has a centrally disposed aperture 75 in its base through which extension 126 of plunger 120 extends into sleeve 73. The base of sleeve 72 provides a reaction surface against which washers 128 react to bias plunger 120 to its rest position relative to housing 112.

As shown in FIG. 4, sleeve 73 has a slightly stepped inner and outer peripheral surface such that it has an upper, continuous collar 76 of greater thickness than its lower portion. Sleeve 73 is secured in the reduced diameter portion of bore 114 by frictional engagement between collar 76 and the inner surface of housing portion 71. Below collar 76, sleeve 73 is provided with longitudinal slits 77, to provide a plurality of resilient fingers 78, of which up to eight preferably are provided. Also, slits 77 are provided with rounded terminal ends 79 to increase resiliency of fingers 78 and to minimize stress concentration.

Radially adjacent an intermediate portion of each finger 78, housing portion 71 is provided with a threaded aperture 80 in which a set screw 81 is provided. Screws 81 are adjusted to deflect fingers 78 inwardly so as to firmly grip in sleeve 73 an inverted, cup-shaped bush 82 of indicator means 130. With plunger 120 in its rest position relative to housing 112, its lower end is engaged by the base 83 of bush 82. However, depression of plunger 120 against the bias of washers 128 causes bush 82 to be depressed, despite the grip of fingers 78; although the fingers retain bush 82 in its depressed position when washers 128 are permitted to return plunger 120 to its rest position.

As shown, bush 82 has a peripheral flange 84 around its lower edge. Flange 84 guides bush 82 in axial movement in sleeve 73. It also enables engagement of bush 82 by a tool (not shown) insertable through aperture 85 in housing portion 71 for levering bush 82 upwardly to re-engage the lower end of plunger 120 when the latter again is in its rest position.

Below bush 82, a dial indicator 86 of indicator means 130 is secured in bore 114 by screws 87 passing through the wall of housing portion 71. Indicator 86 has a graduated dial 88 facing toward the base of device 110, with an indicator needle 89 rotatable on one end of spindle 90 journalled in indicator housing 91. Housing 91 has an extension 92 in which a rod 93 is slidable, rod 93 having a peg 94 extending laterally from its inner end which rides in helical cam-groove 95 in spindle 90. Rod 93 is biased away from dial 88 by resilient element 96 to a rest position in which needle 89 shows a zero reading. On movement of rod against that bias, peg 94 rides along cam-groove 95 to rotate spindle 90 and needle 89; with rotation of spindle 90 tensioning hair-spring coil 97.

Rod 93, when in its rest position, is engaged by base 83 of bush 82. When the latter is depressed by plunger 120, it causes corresponding axial movement of rod 93 to provide a reading on dial 88 due to resultant rotation of spindle 90 and needle 89. Thus, the linear movement of plunger 120 axially in bore 114 is converted to angular movement of needle 89, via spindle 90. Also, due to the action of fingers 78, bush 82 is retained in its depressed position, notwithstanding plunger 120 being allowed to return to its rest position, so that device 110 then can be inverted for viewing of the reading provided by the position of needle 89 on dial 88. With subsequent return of bush 82 to its rest position, element 96 returns rod 93 to its rest position, with reverse rotation of spindle 90 resulting from this and uncoiling action of spring coil 97 to reset needle 89 at its zero setting. It will be appreciated that this return action of element 96 and coil 97 is significantly less than the gripping force exerted by fingers 78 on bush 82, so that this force retains bush 82 and indicator 86 in a read-out condition until bush 82 is re-set to its rest position by insertion of a suitable tool into aperture 85.

As with device 10, plunger extension 124 extends above housing 112; in this case, through an O-ring seal 98. At its upper end, extension 124 has an annular member 164 in the form of a crown seal head of a carbonated beverage bottle. Member 164 is releasably retained, by bolt 166 received axially into extension 124, so as to be replaceable with members of different form. Again, the form and dimensions of device 110 is similar to that of a standard container so that it can be placed in a process line and passed through a capping station in the manner described in relation to FIGS. 1 and 2.

Use of the device can be as described for device 10. However, instead of a reading being provided by adjustment after return of the plunger as with plunger 20 of device 10, a reading is provided by the initial depression of plunger 120. The readout is retained by fingers 78 gripping and retaining bush 82 in its depressed position; with bush 82, utnil it is re-set, holding rod 93 and spindle 90 against return to their zero positions. Insertion of a suitable tool into aperture 85 enables bush 82 and, hence, indicator 86 to be reset. Also, knurled ring 99 is rotatable to enable zero adjustment of the readout scale of dial 88 relative to needle 89, such as to enable recalibration after maintenance of device 110, or after substitution of washers 128 with washers or a spring of different stiffness characteristics.

As indicated above, biasing means other than Belleville washers can be used. Thus, in the forms of device illustrated, a coil spring can be used. It is possible to select between such springs of different length and stiffness to accommodate different magnitudes of forces to be determined, and also to accommodate differences in stroke length over which forces of a given magnitude are applied.

In the foregoing description of the drawings, reference largely is in relation to measuring the force applied by an applicator head. However, it is to be understood that the reading provided by measuring means 30, 130 also is a measure of distance moved by the applicator head in applying that force to depress plunger 20, 120 and a chart or graph can be used to convert from that reading to the distance moved. Also, it will be appreciated that the device can be used to measure distance moved by members other than applicator heads, and the force applied by or to such other members; and that the form of the device can vary to suit a particular application or use.

Finally, it is to be understood that various alterations, modifications and/or additions may be introduced into the constructions and arrangements of parts previously described without departing from the spirit or ambit of the invention.

I claim:

1. A device for measuring the distance moved by an applicator head of a container filling and capping station and, hence, a force applied by the head, the device having a housing member, a plunger member telescopically inter-fitted with the housing member so as to be substantially linearly movable relative thereto, biasing means biasing said members to a rest position, and indicator means mounted on said members; said indicator means having at least one component thereof movable such that, during one stage of relative movement of the members from their rest position against the bias of said biasing means and return to their rest position under said bias, said at least one component is fixed relative to one of said members and movable relative to the other member, and such that during the other stage of that movement said at least one component is fixed relative to the other of said members and movable relative to the one member to thereby provide a measure of the relative movement of the members in one of said stages, and wherein the external form of the device corresponds to a standard container in which a closure member is to be fitted by an applicator head of a container filling and capping machine, such that the device can be inserted upstream from the applicator head in a process line for containers passed through said machine and thereby subjected to the action of the applicator head to obtain a read-out of distance moved or pressure applied by the applicator head.

2. A measuring device according to claim 1, wherein said plunger member is movable axially in a bore defined in the housing member and has an extension thereof projecting beyond one end of said bore exteriorly of the housing member.

3. A measuring device according to claim 2 wherein, at its end remote from the housing member, the plunger member extension has a head portion having a configuration corresponding to that of a standard container to which a closure member is to be fitted by the applicator head of said machine.

4. A measuring device according to claim 2 or claim 4, wherein said bore has an intermediate portion of larger cross-section and said plunger member has a portion of corresponding larger cross-section located within said intermediate bore portion, said housing and plunger members being in their rest position with said plunger member portion abutting a shoulder defined by the end of the intermediate bore portion nearer the one end of the bore.

5. A measuring device according to claim 2, wherein said biasing means comprises spring means located within said housing member.

6. A measuring device according to claim 4, wherein said biasing means comprises spring means located within said intermediate bore portion between the end of the latter remote from the one end of the bore and the plunger member portion of larger section.

7. A measuring device according to claim 5 or claim 6, wherein said spring means comprises a plurality of Belleville washers.

8. A measuring device according to claim 1, wherein said indicator means is adapted to convert substantially linear movement in one stage of movement between said housing and plunger members into rotational movement to provide a read-out indicative of distance moved in that one stage and, hence, of the magnitude of the force applied to the device to effect the stage of said movement against the bias of the biasing means.

9. A measuring device according to claim 2, wherein said indicator means is mounted exteriorly of said housing and plunger members and comprises a sleeve located on the extension of the plunger member, and a calibrated collar rotatable on said sleeve by screw-threaded engagement therewith; the sleeve being frictionally engaged with said extension such that, with said collar rotated to abut the housing member and a zero marker of its calibrations set against a fixed reference mark, the plunger member can be moved against the bias of said biasing means relative to the indicator means and such that, on return of the plunger member to its rest position relative to the housing member, the indicator means moves with the plunger member relative to the housing member so that the collar then can be rotated on the sleeve to again abut the housing member to enable a read-out of the equal distance moved by the plunger member in each direction to be obtained.

10. A measuring device according to claim 9, wherein frictional engagement between the sleeve of the indicator means and the plunger member extension is provided by at least one ball member biased to engage the inner surface of the sleeve under the action of a spring located in a transverse bore in said extension.

11. A measuring device according to claim 2, wherein said indicator means is mounted interiorly of said housing member, within said bore, and comprises a linear movement transmitting member movable longitudinally in said bore, relative to the housing member, by said plunger member during movement of the latter against the action of the biasing means, a spindle extending longitudinally in the bore and rotatable by movement of the transmitting member, and a needle mounted on the spindle and rotatable therewith in relation to a calibrated dial visible from the end of the housing remote from the one end of the bore; said housing including means frictionally engaging the transmitting member in a manner permitting movement of the latter with movement of the plunger member against the bias of the biasing means, but restraining the transmitting member from movement during return movement of the plunger member to its rest position relative to the housing member such that the indicator means remains at a read-out position indicative of the distance moved by the plunger member against the bias of said biasing means.

12. A measuring device according to claim 11, wherein said transmitting member has a cylindrical peripheral wall concentric with said bore and said frictional engaging means comprises a sleeve mounted within the bore and longitudinally slit to define a plurality of gripping fingers frictionally engaing said peripheral wall.

13. A measuring device according to claim 11 or claim 12, wherein said spindle has a helical cam-groove and said indicator means further includes a peg engaged in said groove and movable along said cam-groove, to rotate said spindle, during movement of the transmitting means.

14. A method of determining the force or pressure applied to a container by an applicator head of a container filling and capping station wherein containers in a container process line are moved towards the applicator head, said method comprising inserting into the container process line upstream of the head a device for measuring the force applied by the head to the device, the device having a housing member, a plunger member telescopically inter-fitted with the housing member so as to be substantially linearly movable relative thereto, biasing means biasing said members to a rest position, and indicator means mounted on said members; said indicator means having at least one component thereof movable such that, during one stage of relative movement of the members from their rest position against the bias of said biasing means and return to their rest position under said bias, said at least one component is fixed relative to one of said members and movable relative to the other member, and such that during the other stage of that movement said at least one component is fixed relative to the other of said members and movable relative to the one member to thereby provide a measure of the relative movement of the members in one of said stages and wherein the external form of the device corresponds to a standard container to which a closure member is to be fitted by an applicator head of a container filling and capping machine, such that the device can be inserted upstream from the applicator head in a process line for containers passed through said machine and thereby subjected to the action of the applicator head to obtain a read-out of distance moved or pressure applied by the applicator head, said method further comprising subjecting the device to the action of the applicator head and determining from the indicator means the magnitude and the force or pressure applied to the device by the applicator head.

* * * * *